J. S. Marsh,
Mower.

No. 112,263.    Patented Feb. 28, 1871.

3 Sheets, Sheet 3.

Witnesses
R. T. Campbell
J. N. Campbell

Inventor
James S. Marsh
by
Munn, Fenwick & Lawrence

UNITED STATES PATENT OFFICE.

JAMES S. MARSH, OF LEWISBURG, PENNSYLVANIA.

IMPROVEMENT IN HARVESTERS.

Specification forming part of Letters Patent No. 112,263, dated February 28, 1871.

*To all whom it may concern:*

Be it known that I, JAMES S. MARSH, of Lewisburg, in the county of Union and State of Pennsylvania, have invented certain new and useful Improvements in Harvesting-Machines; and I do hereby declare that the following is a full, clear, and exact description thereof, reference being had to the accompanying drawings, making part of this specification, in which—

Figure 1:
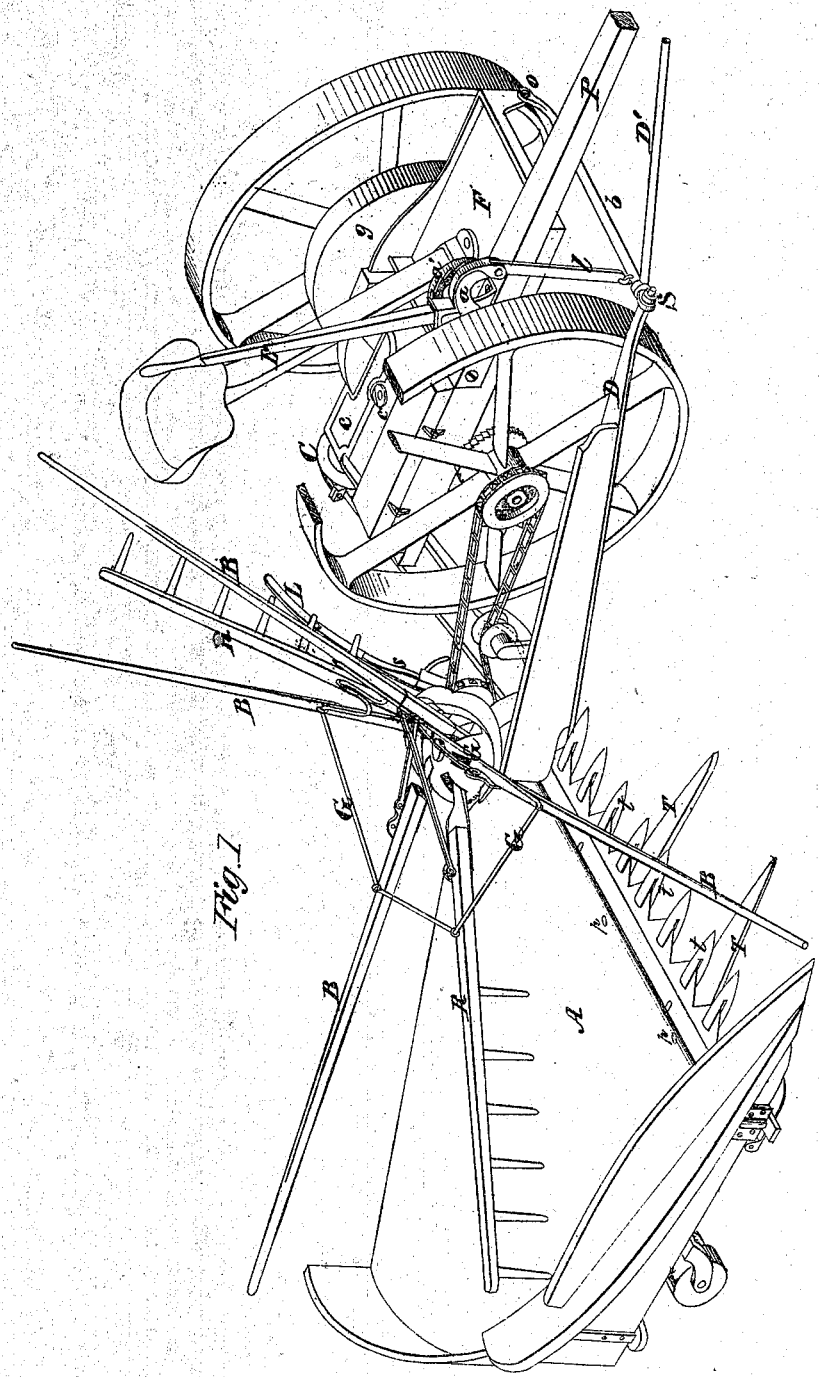
Figure 2:
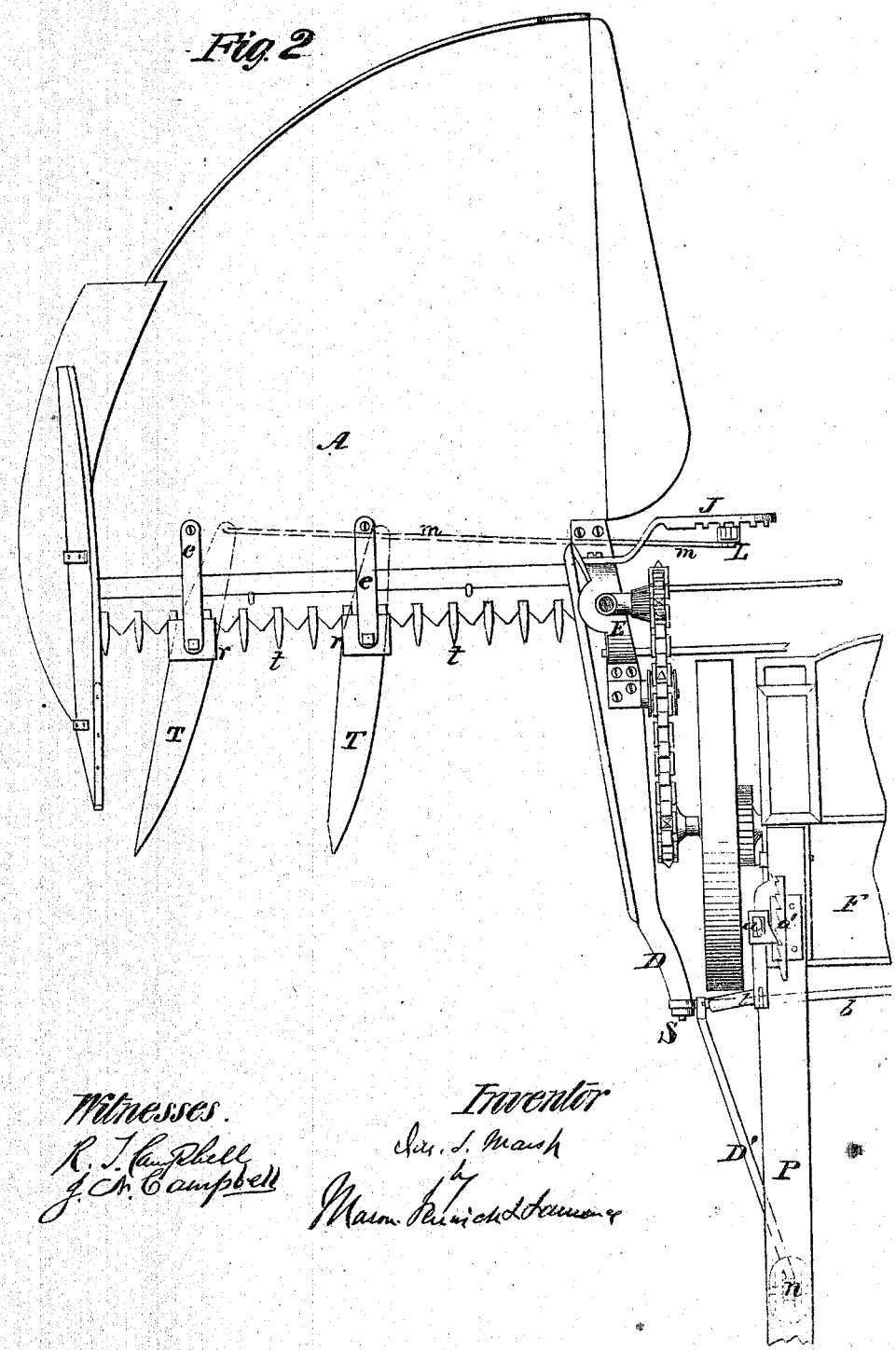
Figure 3:
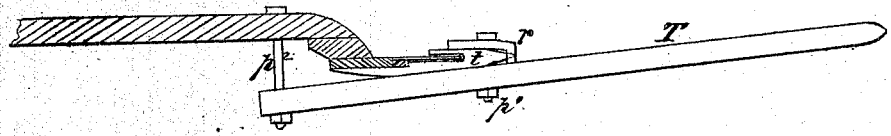
Figure 4:
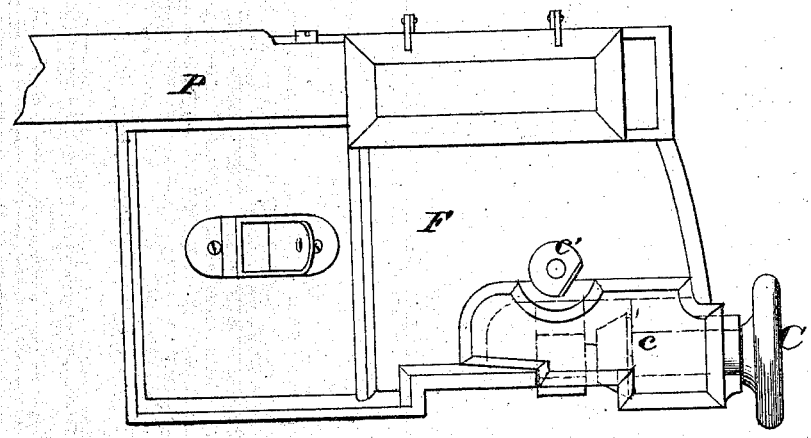
Figure 5:
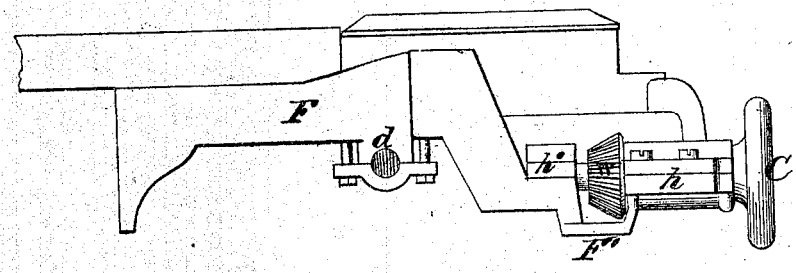

Figure 1, Plate 1, is a perspective view of a harvester having my improvements applied to it. Figure 2, Plate 2, is a top view of the platform and a portion of the draft-carriage of the improved harvester, the rake and beaters being removed. Figure 3, Plate 3, is a sectional view in detail, showing one mode of applying a grain-guide to the front of the platform. Figs. 4 and 5, Plate 3, are views of the improved platform of the draft-carriage.

Similar letters of reference indicate corresponding parts in the several figures.

This invention relates, first, to a grain-guide for directing the standing grain toward the draft-carriage, so that it will, when cut, fall upon the platform in such manner that it can be delivered upon the ground by the rakes in a condition for being conveniently gathered up and bound in gavels; second, to a flexible guard or fender, which is so applied to the rake and beater arms that, while it will not in the least interfere with the movements of said arms, it will effectually prevent grain from falling upon or clogging the rake-gearing; third, to a device for raising and lowering the front end of the platform and its superimposed attachments, whereby a very efficient brace is obtained, and at the same time the guide hitherto employed is dispensed with, a very flexible connection is obtained, and very little friction will attend the adjustments; fourth, to a mode of constructing the platform of the draft-carriage, whereby very large transporting and driving wheels can be employed without raising the shaft of the pitman crank-wheel too high, or giving too great an obliquity or inclination to the pitman-rod that moves the cutters.

The following description will enable others skilled in the art to understand and carry into effect my invention.

*The Grain-Guide.*—In the use of reaping-machines, whether droppers, hand-rakers, or self-rakers, it is very desirable to have the grain that is cut at the inner part of the cutter-bar fall on the grain-table with the heads toward that side of this table nearest the draft-carriage. To accomplish this object successfully I employ one or more grain-guides, T, which I attach in any suitable manner to the front part of the grain-table, so as to extend out in advance of the fingers $t$ a sufficient distance to enter the standing grain as the machine moves forward. The guide or guides T may be arranged at any desired point or points between the ends of the cutting apparatus, and should present an oblique edge to the standing grain, so as to press the grain inward. This obliquity of the inner edge of the guides T may be obtained by tapering them, or by using pointed guides, which are set either adjustable or rigidly fixed oblique to the line of draft or front edge of the grain-table. I have represented the guides T in Figs. 1 and 2 applied to the machine by pivots at $p$, and connected at their rear ends to a rod, $m$, which extends transversely beneath the grain-table to the lower end of a lever, L. By means of this lever the guards can be adjusted so as to have their points more or less outward, and by means of the notched arc J the lever and guides can be held at any desired angle with respect to the front edge of the platform. In Fig. 2 the adjustable guides are represented applied to the machine by means of straps $e$ and caps $r$, into the front ends of which latter the points of the teeth $t$, immediately behind, enter. The pivots in this instance are bolts, which serve to hold the guides in place. In Fig. 3 a plan of attaching a guide, T, is shown, which consists in the use of two bolts, $p^1$ $p^2$, in conjunction with a cap, $r$, which bolts and cap hold the guide rigidly in place.

To adjust the guide of Fig. 3, the rear bolt $p^2$ is removed, the guide moved, as desired, about the bolt $p^1$, and the bolt $p^2$ inserted through another hole made through the grain-table.

In practice, but one guide, T, will answer the purpose for all ordinary circumstances, arranged either below or on top of the grain-table. I do not, therefore, confine myself to the use of two guides, nor to their precise location.

The advantages of the grain-guides are as follows: In cutting grain which is either standing erect, or which is more or less inclined toward the outer shoe, the stalks are liable to fall crosswise of the grain-table, or with the heads toward the standing grain. When this is the case the rake, in its operation of sweeping off the grain, first strikes the butts of the stalks and causes the stalks to move around and lie parallel to the rake, thus causing the under layer of grain in the delivered gavel to lie crosswise of the upper layer, and making a gavel which is inconvenient to bind. The guide T obviates this objection by causing the heads of the grain to fall inward toward the draft-carriage, so that when the rake in its sweep over the platform strikes the butts of the stalks, the stalks will be moved off the grain-table at right angles to the rake, thus leaving a straight gavel, and one which is easy to bind.

When the wind blows crosswise of the machine toward the outer side board, the guide T will prevent the grain from falling with its heads outward.

*The Flexible Guard.*—By reference to Fig. 1 it will be seen that I employ a continuous guard or fender, G, for protecting the rake mechanism from falling grain. This guard I attach to the rake and beater arms R B by rings, or otherwise, and make it of leather, rope, chain, so that it is flexible and will not interfere with the free motions of its arms.

By the employment of this guard G, the grain can be caused to fall toward the side of the grain-table next the draft-carriage, without falling on the gearing which drives the rake and reel arms.

*Device for Adjusting the Grain-Table.*—The inner front corner of the grain-table has a draw-bar, D, securely bolted to it, which bar extends forward, upward, and slightly inward, and is connected at its front end by a pivot, S, to an eye on the end of a transverse brace, $b$. This brace $b$ is pivoted to the inner front corner of the platform F, so that it will allow the front end of bar D to rise and descend freely. This brace $b$ is suspended by a loose connection from an arm, $a$, of a hand-lever, L', by a connecting-rod, $l$. The lever L can be fixed after adjustment to the toothed sector $a'$. Now, for the purpose of steadying the joint at S, and dispensing with the guides, which have been heretofore used, I connect the joint S to the draft-pole at $n$ by means of a stay-rod or auxiliary draw-bar, D'. This bar being connected at its extremities loosely to the rod $b$ and draft-pole P will not, in any manner, interfere with the free vertical motion of the draw-bar D, but will resist any forward or backward motion of said bar D.

By the use of the auxiliary draw-bar D' in lieu of the vertical guide, the parts are much more effective in their action, as very little friction will attend adjustments of the front end of the draw-bar D, and the grain-table, to which it is attached rigidly. This bar D' will not offer obstruction to the machine in passing over ditches, and in mowing it will not gather the cut grass.

*The Carriage-Platform.*—This platform F I construct substantially as described in applications for Letters Patent previously made by me, with this important difference: I now depress the rear inner portion of the platform, as shown in Fig. 5, so as to afford a bearing for the shaft of crank-wheel C, which is below the level of the main portion of the platform. In this depression the half-boxes for the said shaft are formed, so that by the use of caps $h$ $h'$ the boxes are complete. The depression F' receives the pinion $w$, and the plate $c$ covers the depression. A button, $c'$, or its equivalent will secure the plate or cover $c$ down in place.

The pinion $w$, which is on the shaft of the crank-wheel, receives motion from gearing on the axle of the main transporting-wheels; consequently by depressing the bearings for said shaft, larger transporting-wheels can be employed, with a given degree of inclination to the pitman-rod of the cutters, than could be used if the shaft of the crank-wheel were on a level with the main upper portion of the platform F.

I am aware that the crank-wheel shaft has been before placed below the level of the main frame, but not by means of depressing the corner of the cast-metal platform as in my invention.

Having described my invention, what I claim as new, and desire to secure by Letters Patent, is—

1. One or more laterally compressing or directing grain-guides projecting forward of the ordinary guard-fingers, and arranged between the extremities of the cutting apparatus of a reaper, and adapted to direct the standing grain toward the draft-frame, and to otherwise operate, substantially as described.

2. The grain-guides made adjustable by means of devices under control of the attendant when the machine is in operation, substantially as described.

3. A flexible guard or fender, G, applied to the revolving rake and beater arms, substantially as described.

4. The auxiliary draw-rod D' in combination with the transverse rod $b$, the draw-bar D, and an adjusting device, substantially as described.

5. The cast-metal platform F, with the depressed corner portion F', in combination with the shaft and wheel of the crank-wheel C, and with the cover-plate $c$, when all these parts are constructed in the manner described and shown.

JAMES S. MARSH.

Witnesses:
J. V. CAMPBELL,
EDM. F. BROWN.